(12) United States Patent
Paik et al.

(10) Patent No.: US 8,964,153 B2
(45) Date of Patent: Feb. 24, 2015

(54) IN-PLANE SWITCHING MODE LIQUID CRYSTAL DISPLAY DEVICE AND FABRICATING METHOD THEREOF

(75) Inventors: Sang Yoon Paik, Seoul (KR); Sung-Lim Nam, Seoul (KR)

(73) Assignee: LG Display Co., Ltd., Seoul (KR)

( * ) Notice: Subject to any disclaimer, the term of this patent is extended or adjusted under 35 U.S.C. 154(b) by 772 days.

(21) Appl. No.: 11/168,371

(22) Filed: Jun. 29, 2005

(65) Prior Publication Data

US 2006/0001814 A1    Jan. 5, 2006

(30) Foreign Application Priority Data

Jun. 30, 2004    (KR) .................. 10-2004-0050815

(51) Int. Cl.
  *G02F 1/1333*    (2006.01)
  *G02F 1/1343*    (2006.01)
  *G02F 1/1362*    (2006.01)
  *G02F 1/1335*    (2006.01)

(52) U.S. Cl.
  CPC .... *G02F 1/136209* (2013.01); *G02F 1/133512* (2013.01); *G02F 1/134363* (2013.01)
  USPC .............................. 349/141; 349/110; 349/111

(58) Field of Classification Search
  CPC .................. G02F 1/133512; G02F 1/136209; G02F 1/134363
  USPC ..................... 349/145, 141, 39, 110–111
  See application file for complete search history.

(56) References Cited

U.S. PATENT DOCUMENTS

| | | | |
|---|---|---|---|
| 6,133,977 A * | 10/2000 | Lee et al. ..................... | 349/141 |
| 6,577,368 B1 * | 6/2003 | Yuh et al. ..................... | 349/141 |
| 7,027,109 B2 * | 4/2006 | Sera et al. ..................... | 349/44 |
| 2001/0046019 A1 * | 11/2001 | Lee et al. ..................... | 349/141 |
| 2002/0044244 A1 * | 4/2002 | Lee ............................. | 349/141 |
| 2002/0057411 A1 * | 5/2002 | Kim et al. ..................... | 349/141 |
| 2002/0093614 A1 * | 7/2002 | Moon et al. ................... | 349/141 |
| 2004/0070717 A1 * | 4/2004 | Hong et al. .................... | 349/141 |
| 2004/0212761 A1 * | 10/2004 | Kadotani et al. ............... | 349/110 |
| 2005/0007524 A1 * | 1/2005 | Luo et al. ..................... | 349/110 |
| 2005/0179846 A1 * | 8/2005 | Lee et al. ..................... | 349/141 |
| 2007/0040978 A1 * | 2/2007 | Nakayoshi et al. ........... | 349/141 |

* cited by examiner

*Primary Examiner* — Jessica M Merlin
(74) *Attorney, Agent, or Firm* — Birch, Stewart, Kolasch & Birch, LLP

(57) ABSTRACT

An in-plane switching mode liquid crystal display device includes a first substrate and a second substrate, a gate line and a data line crossing each other on the first substrate to define a pixel region, a switching device at a crossing of the gate line and the data line, a pixel electrode and a common electrode on the first substrate for generating an in-plane electric field in the pixel region, a black matrix, a light blocking line, the light blocking line being below the black matrix and above the data line, the light blocking line covering a gap between the data line and the common electrode adjacent to the data line, and a liquid crystal layer formed between the first and second substrates.

12 Claims, 8 Drawing Sheets

IN-PLANE SWITCHING MODE LIQUID CRYSTAL DISPLAY DEVICE AND FABRICATING METHOD THEREOF

This Nonprovisional application claims priority under 35 U.S.C. §119(a) on Patent Application No. 10-2004-0050815 filed in Korea on Jun. 30, 2004, the entire contents of which are hereby incorporated by reference.

BACKGROUND OF THE INVENTION

1. Field of the Invention

The present invention relates to an in-plane switching mode liquid crystal display device, and more particularly, to an in-plane switching mode liquid crystal display device and a fabrication method thereof which can improve image quality by preventing VAC (Viewing Angle Cross Talk) deficiency.

2. Description of the Related Art

Liquid crystal displays are typically used as flat panel display devices which have low power consumption and provide high picture quality. A liquid crystal display device is formed by attaching face to face a thin film transistor array substrate and a color filter substrate with a uniform interval therebetween, and disposing a liquid crystal layer between the thin film transistor array substrate and the color filter substrate. Pixel regions are arranged on the thin film transistor array substrate in a matrix manner. A thin film transistor, a pixel electrode and a capacitor are formed within the pixel region. A common electrode and the pixel electrode-apply an electric field to the liquid crystal layer. An RGB color filter and a black matrix are formed on the color filter substrate.

Meanwhile, an alignment film is formed at surfaces of the thin film transistor array substrate and the color filter substrate facing each other and is rubbed to orient the liquid crystal material in a specified direction. When an electric field is applied between the pixel electrode and the common electrode, the liquid crystal material rotates due to dielectric anisotropy. As a result, light is transmitted or blocked by pixels to display the image. However, such a twisted nematic mode liquid crystal display device has a narrow viewing angle.

Accordingly, an in-plane switching mode LCD has been recently introduced to improve the narrow viewing angle by aligning liquid crystal molecules in a substantially horizontal direction with respect to the substrate.

Figure 1A:
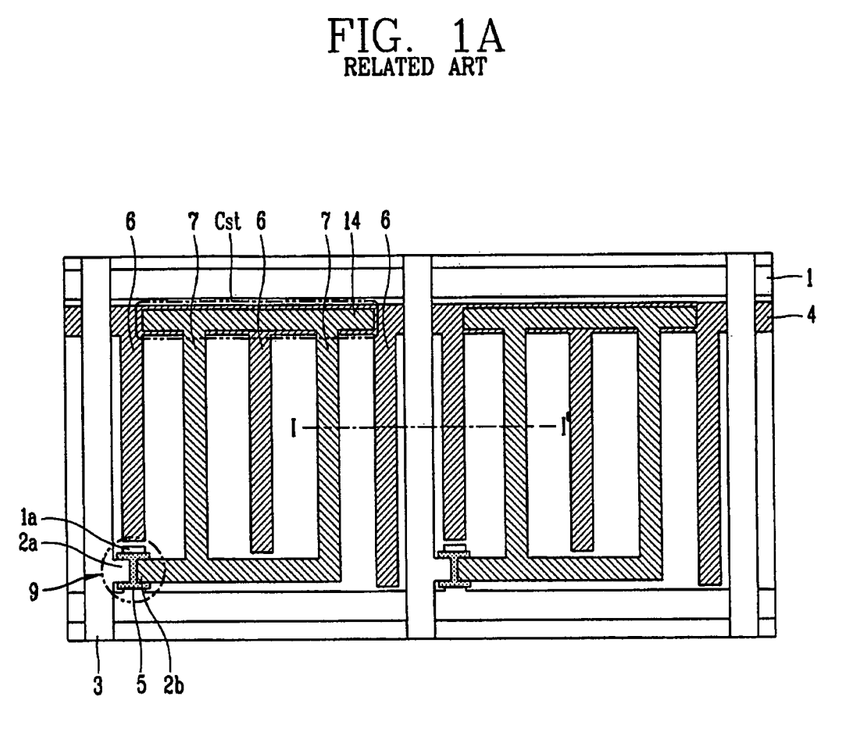
Figure 1B:
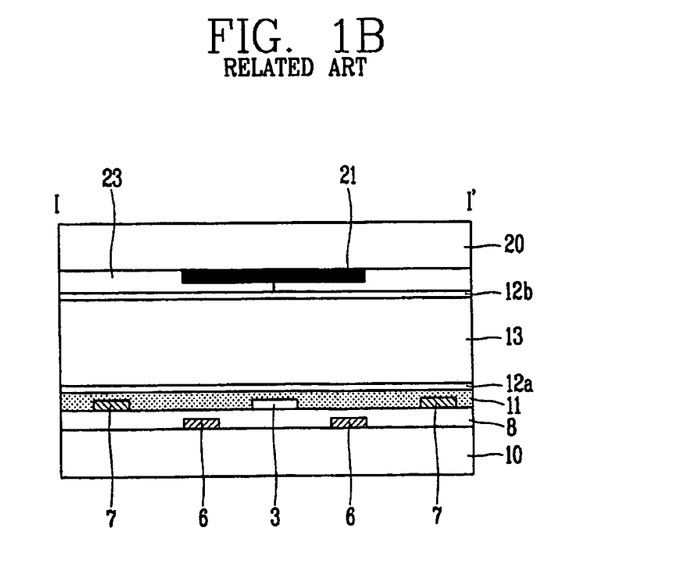

FIGS. 1A and 1B schematically illustrates pixels of a typical in-plane switching mode liquid crystal display device. FIG. 1A is a plane view and FIG. 1B is a cross-sectional view taken along line I-I' of FIG. 1A. As shown therein, gate lines 1 and data lines 3 are arranged horizontally and vertically on a first transparent substrate 10 to define the pixel regions. Although in an actual liquid crystal display device, there are N gate lines 1 and M data lines 3 crossing each other to create N×M pixels, only two pixels are shown in the drawing for explanatory purposes.

A thin film transistor 9 is disposed at a crossing of the gate line 1 and the data line 3. The thin film transistor 9 includes a gate electrode 1a, a semiconductor layer 5 and source/drain electrodes 2a and 2b. The gate electrode 1a is connected to the gate line 1. The source/drain electrodes 2a and 2b are connected to the data line 3 and a pixel electrode 7, respectively. A gate insulation layer 8 is formed on the entire substrate 10.

A common line 4 is arranged parallel to the gate line 1 in the pixel region. A pair-of electrodes, which are the common electrode 6 and the pixel electrode 7, are arranged parallel to the data line 3 for switching liquid crystal molecules. The common electrode 6 is simultaneously formed with the gate line 1 and is connected to the common line 4. The pixel electrode 7 is simultaneously formed with the source/drain electrodes 2a and 2b and is connected to the drain electrode 2b. A passivation layer 11 is formed on the entire surface of the substrate 10 including the source/drain electrodes 2a and 2b. In addition, the pixel electrode line 14 formed to overlap the common line 4 forms a storage capacitor (Cst) with the gate insulation layer 8 interposed therebetween.

In addition, a black matrix 21 and a color filter 23 are formed on a second substrate 20, on which an overcoat layer (not shown) may be formed for flattening the color filter 23. The black matrix 21 prevents light leakage where the thin film transistor 9, the gate line 1 and the data line 3 are located. The color filter 23 provides color display capabilities to the liquid crystal display device. In addition, alignment films 12a and 12b are applied at the surfaces of the first and second substrates 10 and 20 facing each other. The alignment films 12a and 12b determine an initial alignment direction of the liquid crystal.

Also, a liquid crystal layer 13 is formed between the first and second substrates 10 and 20. The liquid crystal layer 13 controls the light transmittance by a voltage applied between the common electrode 6 and the pixel electrode 7.

The conventional in-plane switching mode liquid crystal display device having such a construction can improve a viewing angle because the common electrode 6 and the pixel electrode 7 are arranged on the same substrate and generate an in-plane electric field.

On the other hand, light leakage may occur at a specific viewing angle when misalignment between the common electrode 6 and the data line 3 of the first substrate 10 or misalignment between the first substrate 10 and the second substrate 20 occurs.

Figure 2:
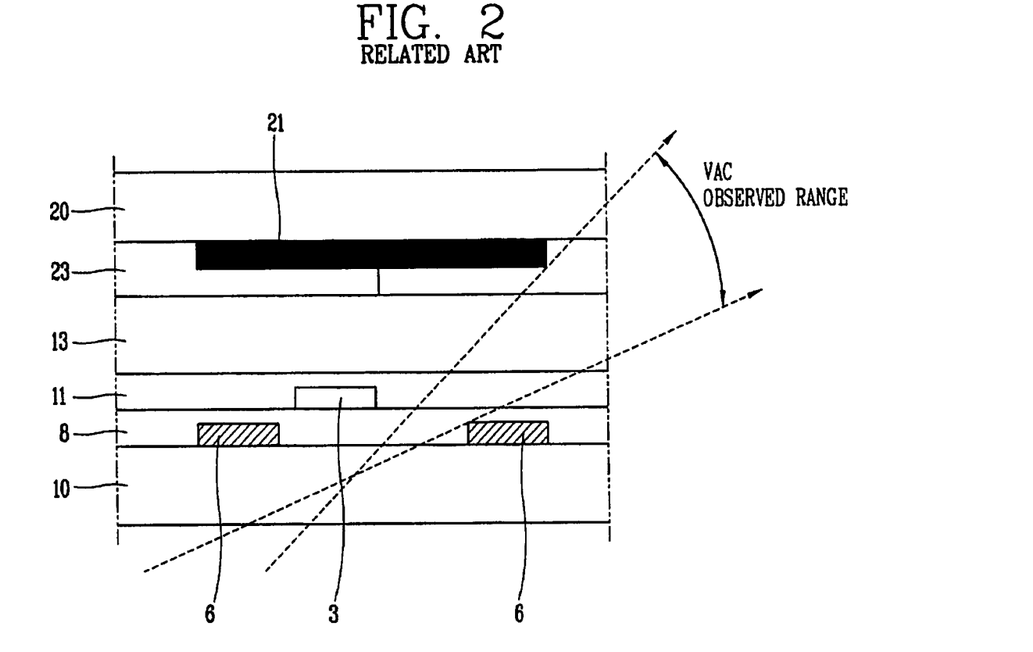
FIG. 2 is a sectional view to describe problems of a liquid crystal display device in a related art.
Figure 3:
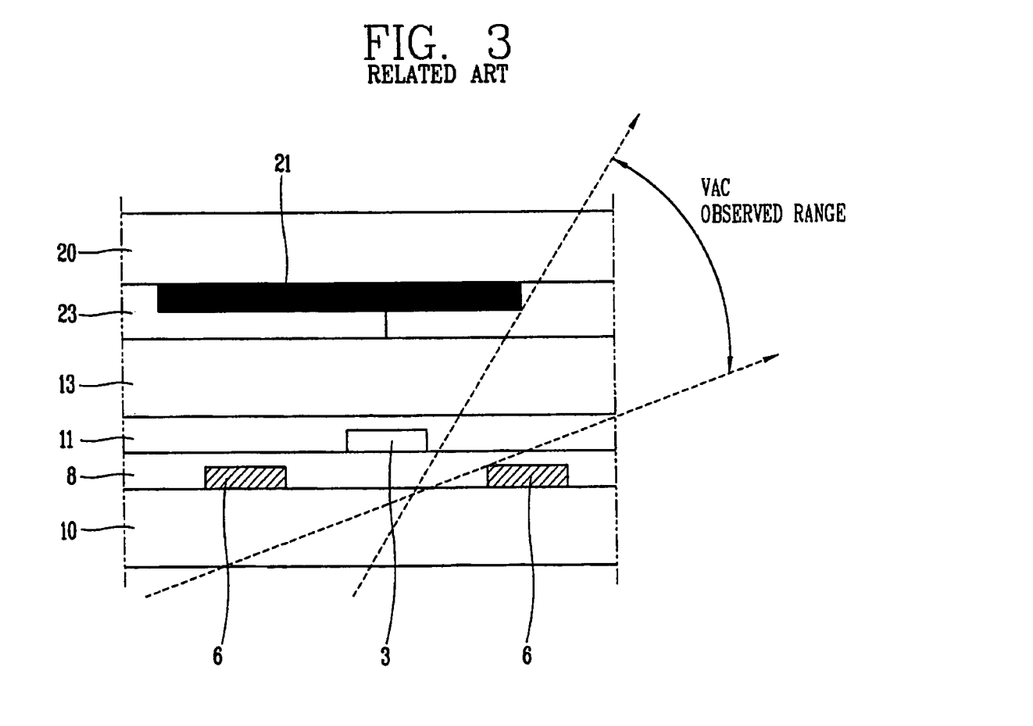
FIG. 3 is a sectional view to describe problems of the liquid crystal display device in the related art.

FIGS. 2 and 3 are sectional views of a liquid crystal display device to illustrate the problems in the related art, wherein an alignment film is omitted. As shown in FIG. 2, when the misalignment between the common electrode 6 and the data line 3 occurs and therefore the data line 3 is shifted to the left, the data line 3 becomes relatively far from the common electrode 6 formed on a right pixel. Accordingly, light leakage (indicated by arrow in the drawing) through a gap between the data line 3 and the common electrode 6 of the right pixel occurs at a specific range of viewing angles. That is, when the viewer is in front of the LCD device, the light leakage can be blocked by the black matrix 21 formed on the second substrate 20. However, when the viewer faces the LCD device within the specific range of viewing angles, the light leakage will be seen in that specific area where light is not blocked by the black matrix 21.

Accordingly, an undesired line is observed on a screen because of the light leakage between the data line 3 and the common electrode 6 of the right pixel at the specific range of viewing angles. A defect displayed on the screen because of the light leakage occurred at the specific range of viewing angles is referred to as VAC (Viewing Angle Cross Talk) deficiency.

Also, as shown in FIG. 3, when the misalignment between the first substrate 10 and the second substrate 20 occurs in the process of attaching the first substrate 10 and the second substrate 20 to each other, the black matrix 21 formed on the first substrate 10 inclines toward a left pixel. Therefore, light leakage occurs between the data line 3 and the common electrode 6 formed on the right side of the data line 3. In particular, the VAC deficiency is observed only at the specific range of viewing angles.

SUMMARY OF THE INVENTION

Therefore, an object of the present invention is to provide an in-plane switching mode liquid crystal display device and a fabrication method thereof which can improve image quality and prevent VAC deficiency by forming a light blocking line for covering a gap between the data line and the common electrode adjacent to the data line.

Another object of the present invention is to provide a liquid crystal display device and a fabrication method thereof which can improve an aperture ratio by forming at least one of a common electrode and a pixel electrode, which generate an in plane electric field in a pixel, of a transparent conductive material.

To achieve these and other advantages and in accordance with the purpose of the present invention, as embodied and broadly described herein, there is provided an in-plane switching mode liquid crystal display device comprising: first and second substrates; a plurality of gate lines arranged in a first direction on the first substrate; a plurality of data lines arranged in a second direction crossing the first direction and defining pixels together with the gate lines; a switching device formed at a crossing of the gate line and the data line; at least one pair of a pixel electrode and a common electrode arranged toward the first direction and generating an in plane electric field in the pixel; a common line electrically connecting the common electrode; a light blocking line formed to cover space between the data line and the common electrode adjacent to the data line; and a liquid crystal layer formed between the first and second substrates.

To achieve these and other advantages and in accordance with the purpose of the present invention, as embodied and broadly described herein, there is provided a liquid crystal display device comprising: first and second substrates; a plurality of gate lines arranged in a first direction on the first substrate; a plurality of common electrodes formed on the first substrate; a gate insulation layer formed over an entire surface of the first substrate including the gate lines and common electrodes; a plurality of data lines arranged in a second direction crossing the first direction on the gate insulation layer and defining pixel regions together with the gate lines; a passivation layer formed over the entire surface of the first substrate including the data lines; a plurality of pixel electrodes formed on the passivation layer and generating an in plane electric field in the pixel regions together with the common electrodes; a light blocking line formed to cover space between the data lines and the common electrodes adjacent to the data lines; and a liquid crystal layer formed between the first and second substrates.

To achieve these and other advantages and in accordance with the purpose of the present invention, as embodied and broadly described herein, there is provided a liquid crystal display device comprising: first and second substrates; a plurality of gate lines arranged in a first direction on the first substrate; a plurality of common electrodes formed on the first substrate; a gate insulation layer formed over an entire surface of the first substrate including the gate lines and common electrodes; a plurality of data lines arranged in a second direction crossing the first direction on the gate insulation layer and defining pixel regions together with the gate lines; a plurality of pixel electrodes generating an in plane electric field in the pixel regions together with the common electrodes; a passivation layer formed over the entire surface of the first substrate including the data lines and the pixel electrodes; a light blocking line formed on the passivation layer and formed to cover space between the data lines and the common electrodes adjacent to the data lines; and a liquid crystal layer formed between the first and second substrates.

To achieve these and other advantages and in accordance with the purpose of the present invention, as embodied and broadly described herein, there is provided a method for fabricating a liquid crystal display device; providing first and second substrates; providing first and second substrates; forming a plurality of gate lines arranged in a first direction on the first substrate; forming a plurality of common electrodes formed on the first substrate; forming a gate insulation layer over an entire surface of the first substrate including the gate lines and common electrodes; forming a plurality of data lines arranged in a second direction crossing the first direction on the gate insulation layer and defining pixel regions together with the gate lines; forming a passivation layer over the entire surface of the first substrate including the data lines; forming a plurality of pixel electrodes on the passivation layer, for generating an in plane electric field in the pixel regions together with the common electrodes; forming a light blocking line on the passivation layer, for covering space between the data lines and the common electrodes adjacent to the data lines; and forming a liquid crystal layer between the first and second substrates.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 1A and 1B illustrate a typical in-plane switching mode liquid crystal display device, wherein FIG. 1A is a plane view and FIG. 1B is a sectional view taken along line I-I';

FIGS. 4A and 4B illustrate a first embodiment of the present invention, wherein FIG. 4A is a plane view and FIG. 4B is a sectional view taken along line II-II';

FIGS. 5A and 5B illustrate a second embodiment of the present invention, wherein FIG. 5A is a plane view and FIG. 5B is a sectional view taken along line 111-III';

FIGS. 6A and 6B illustrate a third embodiment of the present invention, wherein FIG. 5A is a plane view and FIG. 5B is a sectional view taken along line III-III';

DETAILED DESCRIPTION OF THE PREFERRED EMBODIMENTS

Hereinafter, reference will now be made in detail to the preferred embodiments of the present invention, examples of which are illustrated in the accompanying drawings.

Figure 4A:
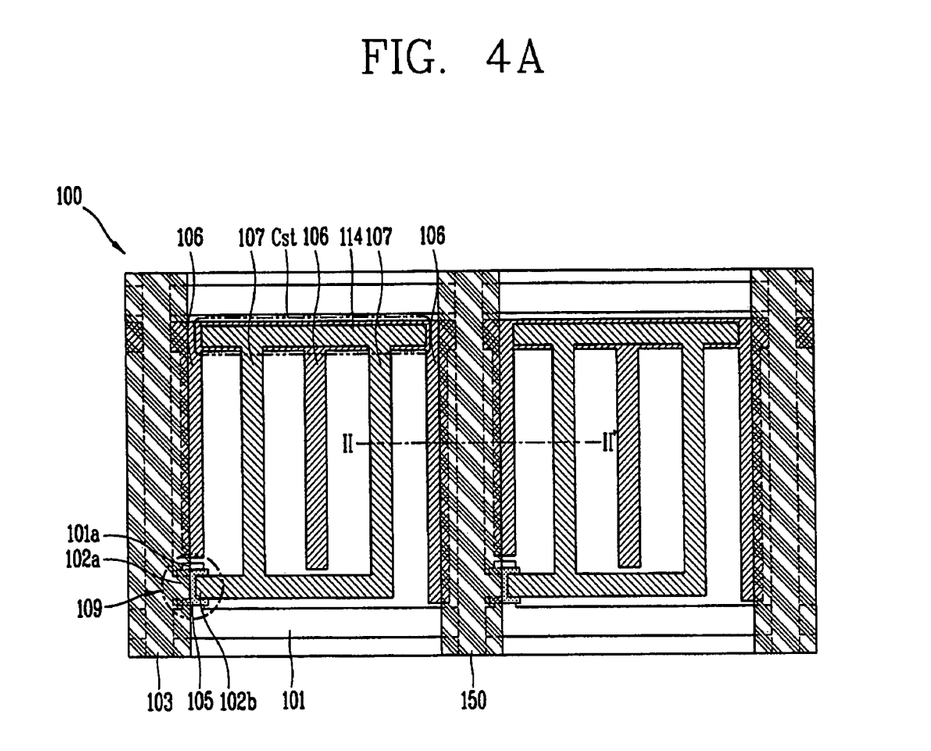
Figure 4B:
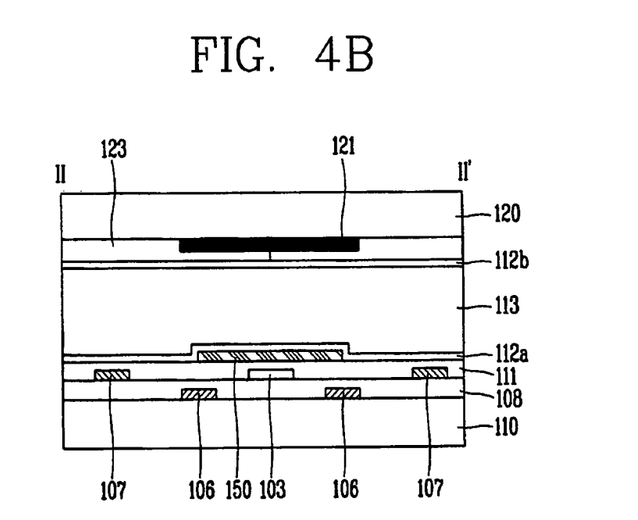

FIGS. 4A and 4B illustrate an in-plane switching mode liquid crystal display device in accordance with a first embodiment of the present invention. FIG. 4A is a plane view illustrating two pixels in accordance with a first embodiment of the present invention, and FIG. 4B is a sectional view taken along line II-II' of FIG. 4A.

As shown therein, in a liquid crystal display device 100 of a first embodiment, the gate lines 101 arranged in a first direction and the data lines 103 arranged in a second direction are formed on a first transparent substrate 110 to define pixel regions (P). A switching device 109 is formed at a crossing of the gate line 101 and the data line 103. The switching device 109 is a thin film transistor, and includes a gate electrode 101a formed by part of the gate line 101, a semiconductor layer 105 formed on the gate electrode 101a and source/drain electrodes 102a and 102b separated at a predetermined interval and arranged on the semiconductor layer 105.

At least a common electrode 106 and a pixel electrode 107 which generate an in-plane electric field are formed in the pixel region (P). The common electrode 106 and the pixel electrode 107 are arranged parallel to each other. Though not shown in the drawing, the common electrodes 106 and 106' and the pixel electrode 107 may have a bent structure. When the common electrodes 106 and the pixel electrode 107 have the bent structure, a color shift phenomenon according to birefringence of liquid crystal is minimized. Therefore, the deterioration in image quality due to the viewing angle can be prevented. The data line 103 can have a bent structure together with the common electrode 106 and the pixel electrode 107.

Meanwhile, the common electrode 106 and the pixel electrode 107 may be arranged parallel to the gate line 101. In an embodiment, when the common electrode 106 and the pixel electrode 107 have the bent structure, the gate line 101 may have the bent structure.

The common electrode 106 is electrically connected to a common line 104, and the pixel electrode 107 is electrically connected to a pixel electrode line 114. The pixel electrode line 114 overlaps the common line 104 to form a storage capacitor (Cst).

In addition, a light blocking line 150 is formed over the data line 103. The light blocking line 150 covers a gap between the data line 103 and the common electrode 106 adjacent to the data line 103, and overlaps part of the common electrode 106. When the common electrode 106 and the pixel electrode 107 have the bent structure and the data line 103 has the bent structure, the light blocking line 150 may have the same bent structure as the data line 103.

The light blocking line 150 serves to prevent light leakage from the gap between the data line 103 and the common electrode 106. That is, as described in the related art (Refer to FIGS. 2 and 3), because of the misalignment between the common electrode and the data line or the misalignment between the thin film transistor substrate and the color filter substrate, light leakage through the gap of the data line 103 and the common line 104 in the range of a specific viewing angle at the side of a liquid crystal panel generates the VAC deficiency. The light blocking line 150 solves the VAC deficiency by blocking light leaked in the range of the specific viewing angle when such misalignment occurs (misalignment between the common electrode and the data line or misalignment between the thin film transistor substrate and the color filter substrate).

Meanwhile, when the data line 103, the common electrode 106 and the pixel electrode 107 have the bent structure, the light blocking line 150 may have the same bent structure as the data line 103.

In addition, as shown in FIG. 4B, the common electrode 106 is formed on the first substrate 110, and a gate insulation layer 108 is formed on the first substrate 110 including the common electrode 106. The pixel electrode 107 and the data line 103 are coplanar and are formed on the gate insulation layer 108. A passivation layer 111 is formed on an entire surface of the gate insulation layer 108 including the pixel electrode 107 and the data line 103. The light blocking line 150 is formed on the passivation layer 111 to cover the gap between the data line 103 and the common electrode 106.

In addition, the light blocking line 150 may be formed of a transparent conductive material such as ITO or IZO. In particular, the light blocking line 150 can be formed together when forming a gate pad and a data pad formed to supply a signal to the gate line 101 and the data line 103.

Meanwhile, in this embodiment, a black matrix 121 for preventing light leakage where the thin film transistor 109, the gate line 101 and the data line 103 are located, and a color filter 123 providing color display capabilities are formed on a second substrate 120. An overcoat film (not shown) is applied on the second substrate 120 in order to flatten the color filter 123. In addition, alignment films 112a and 112b which determine an initial alignment direction of the liquid crystal are applied at the surfaces of the first and second substrates 110 and 120 facing each other.

In addition, a liquid crystal layer 113 is formed between the first and second substrates 110 and 120, and controls the light transmittance via a voltage applied between the common electrode 106 and the pixel electrode 107.

The color filter 123 may be formed on the first substrate 110. In particular, the color filter 123 may be formed by a COT (color filter on TFT) structure where a color filter is formed on a thin film transistor or by a TOC (TFT on color filter) structure where a thin film transistor is formed on a color filter.

The first embodiment of the present invention having such a structure can prevent light leakage which occurs at a side viewing angle by the light blocking line 150 and therefore solve the VAC deficiency problem.

However, the liquid crystal display device having such a structure reduces an aperture ratio since the common electrode 106 and the pixel electrode 107 arranged in the pixel region are formed of an opaque metal material. Accordingly, an embodiment of the present invention improves the aperture ratio by forming at least one of the common electrode and the pixel electrode of a transparent conductive material.

Figure 5A:
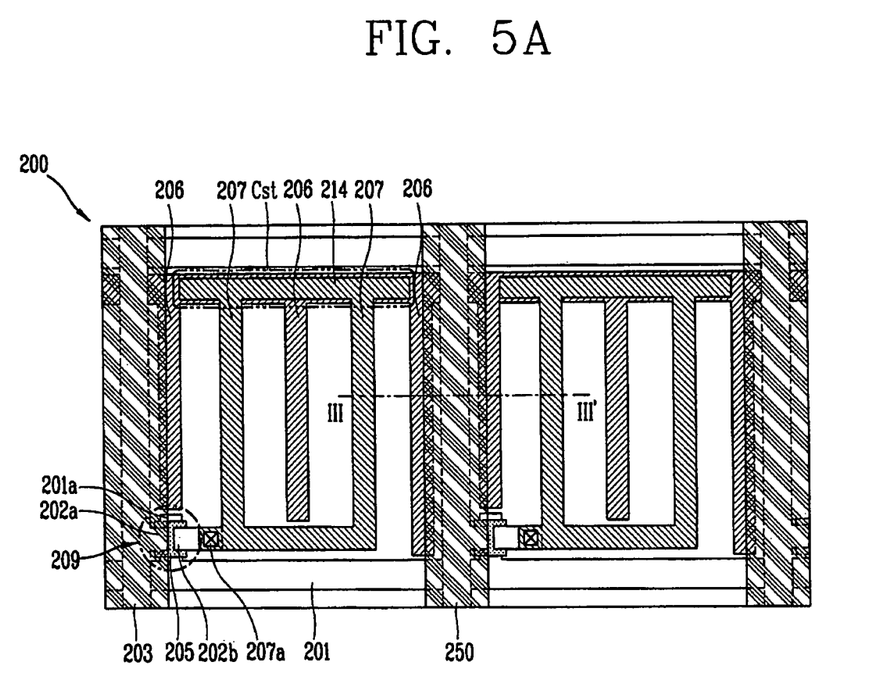
Figure 5B:
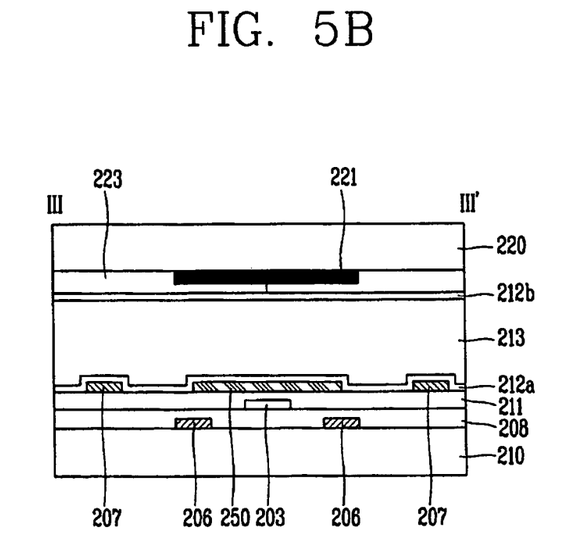
Figure 6A:
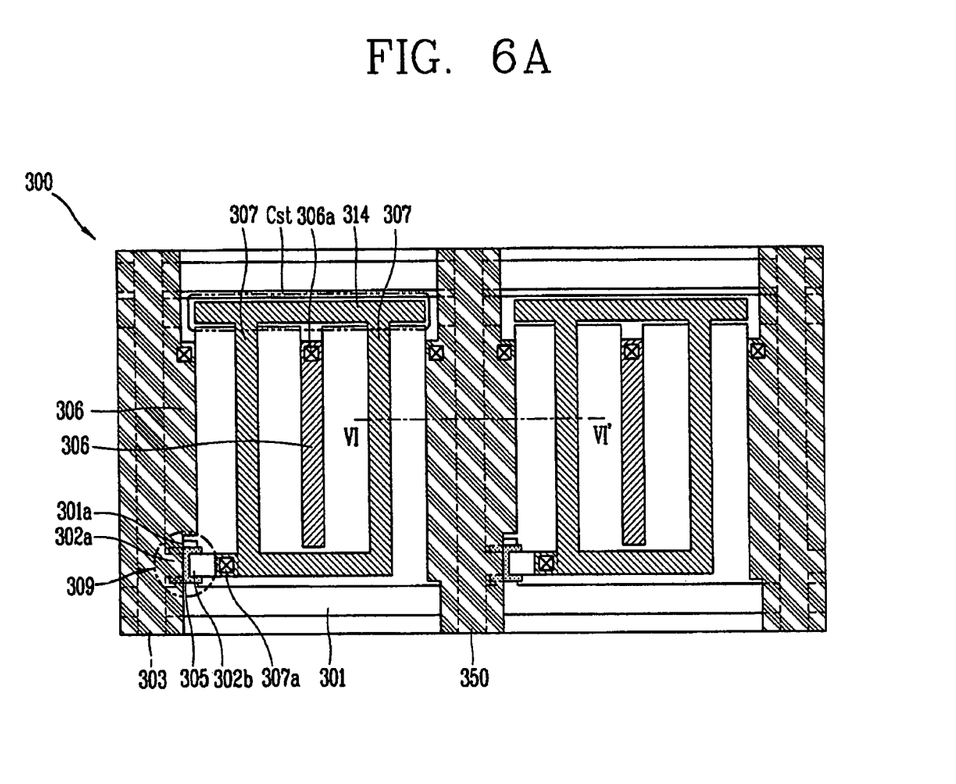
Figure 6B:
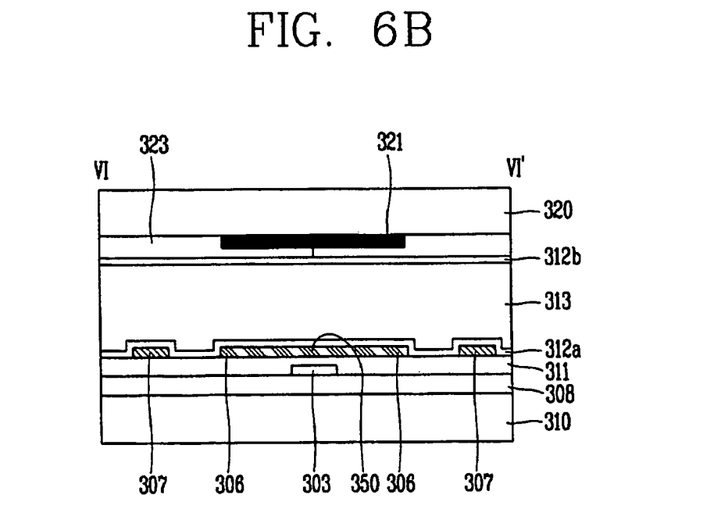

FIGS. 5A and 5B and FIGS. 6A and 6B illustrate liquid crystal display devices in accordance with second and third embodiments of the present invention. FIGS. 5A and 5B illustrate the second embodiment of the present invention, wherein a pixel electrode is formed of a transparent material. FIGS. 6A and 6B illustrate the third embodiment of the present invention, wherein both a common electrode and a pixel electrode are formed of a transparent material. The second and third embodiments have the same components as the first embodiment, except for locations where the common electrode and the pixel electrode are formed and materials of which the common electrode and the pixel electrode are formed. Accordingly, only the differences from the first embodiment (FIGS. 4A and 4B) will be described in the second and third embodiments.

FIG. 5A is a plane view of a liquid crystal display device in accordance with the second embodiment of the present invention. FIG. 5B is a sectional view taken along line III-III' of FIG. 5A.

As shown therein, in a liquid crystal display device 200 in accordance with the second embodiment of the present invention, a pixel electrode 207 is formed of a transparent conductive material such as ITO or IZO and a light blocking line 250 is formed together with the pixel electrode 207. Accordingly, the pixel electrode 207 and the light blocking line 250 are formed on a passivation layer 211, and the pixel electrode 207 is electrically connected to a drain electrode 202b of a thin film transistor 209 through a drain contact hole 207a. The common electrode 206 is formed on a first substrate 210, and a data line 203 is formed on a gate insulation layer 208 formed on an entire surface of the first substrate 210 including the common electrode 206

The pixel electrode 207 and the common electrode 206 may also have a bent structure, so as the data line 203.

In addition, a color filter 223 may be formed on the first substrate 210. In particular, the color filter 223 may be formed by a COT (color filter on TFT) structure where a color filter is formed on a thin film transistor or by a TOC (TFT on color filter) structure where a thin film transistor is formed on a color filter.

As described, as the pixel electrode is formed of a transparent conductive material, an aperture ratio can be improved compared to the first embodiment.

FIG. 6A is a plane view of a liquid crystal display device in accordance with the third embodiment of the present invention. FIG. 6B is a sectional view taken along line VI-VI' of FIG. 6A.

As shown therein, in a liquid crystal display device 300 in accordance with the third embodiment of the present invention, a common electrode 306 and a pixel electrode 307 generating an in-plane electric field in a pixel region are formed of a transparent conductive material such as ITO or IZO. And, a light blocking line 350 is integrally formed with the common electrode 306 adjacent to the data line 303. That is, since the common electrode 306 and the light blocking line 350 are formed on the same plane (i.e., passivation layer 311), the light blocking line 350 is structurally connected to the common electrode 306.

In addition, a common line 304 electrically connected to the common electrode 306 is formed on a first substrate 310. The common electrode 306 is connected to the common line 304 through a common electrode contact hole 306a. In addition, a pixel electrode line 314 electrically connected to a pixel electrode 307 overlaps the common line 304 to form a storage capacitor (Cst). The common electrode 306 and the pixel electrode 307 may also have the bent structure.

In addition, the color filter 323 may be formed on the first substrate 310. In particular, the color filter 323 may be formed by a COT (color filter on TFT) structure where a color filter is formed on a thin film transistor or by a TOC (TFT on color filter) structure where a thin film transistor is formed on a color filter.

In the third embodiment of the present invention having such a construction can improve the aperture ratio compared to the first embodiment as both the common electrode 306 and the pixel electrode 307 are formed of a transparent conductive material such as ITO or IZO.

In addition, this embodiment can provide a strong electric field applied to a liquid crystal layer between two electrodes because the common electrode 306 and the pixel electrode 307 are formed on the same plane (i.e., passivation layer: 311). The strong electric field causes liquid crystal molecules in the liquid crystal layer to be switched at a higher speed, thereby facilitating the implementation of a moving picture.

FIGS. 7A to 7D and FIGS. 8A to 8D illustrate fabrication processes of the in-plane switching mode liquid crystal display device in accordance with the second embodiment.

FIGS. 7A to 7D are plane views showing the fabrication processes, and FIGS. 8A to 8D are sectional views showing the fabrication processes.

Figure 7A:
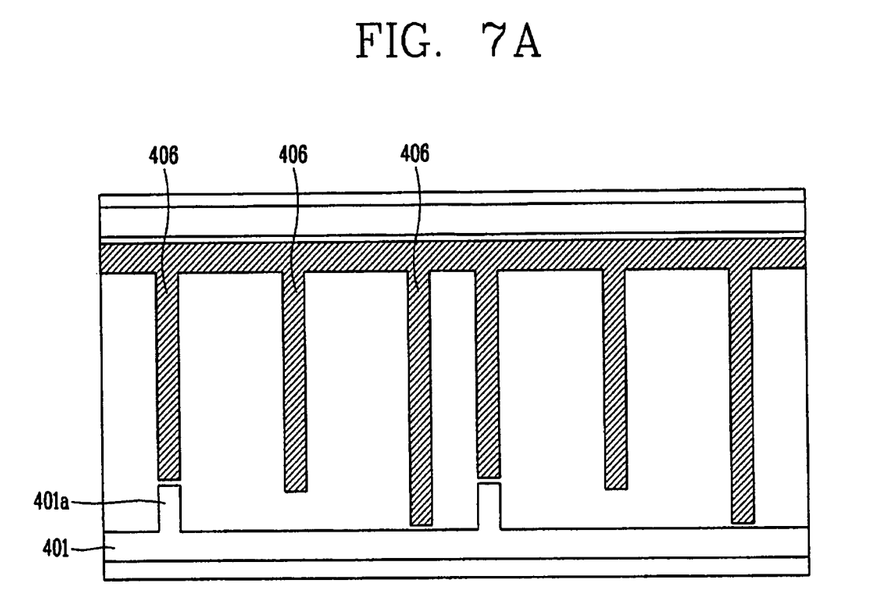
FIGS. 7A to 7D illustrate fabrication processes of the in-plane switching mode liquid crystal display device in accordance with the second embodiment.
Figure 8A:
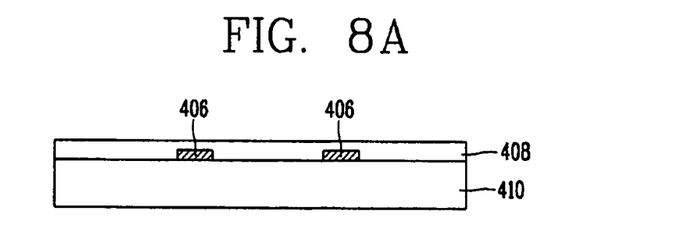
FIGS. 8A to 8D illustrate fabrication processes of the in-plane switching mode liquid crystal display device in accordance with the second embodiment.

First, as shown in FIGS. 7A and 8A, a transparent first substrate 410 is provided. Then, after a first metal material such as Cu, Ti, Cr, Al, Mo, Ta and an Al alloy is deposited over a first substrate 410, the first metal material is patterned to form a gate line 401, a gate electrode 401a, a common line 404 arranged parallel to the gate line 401, and a common electrode 406 perpendicularly diverged from the common line 404.

Thereafter, SiNx or SiOx is deposited over the entire surface of the substrate including the gate line 401 and the common electrode 406 by a plasma CVD method to thereby form a gate insulation layer 408.

Figure 7B:
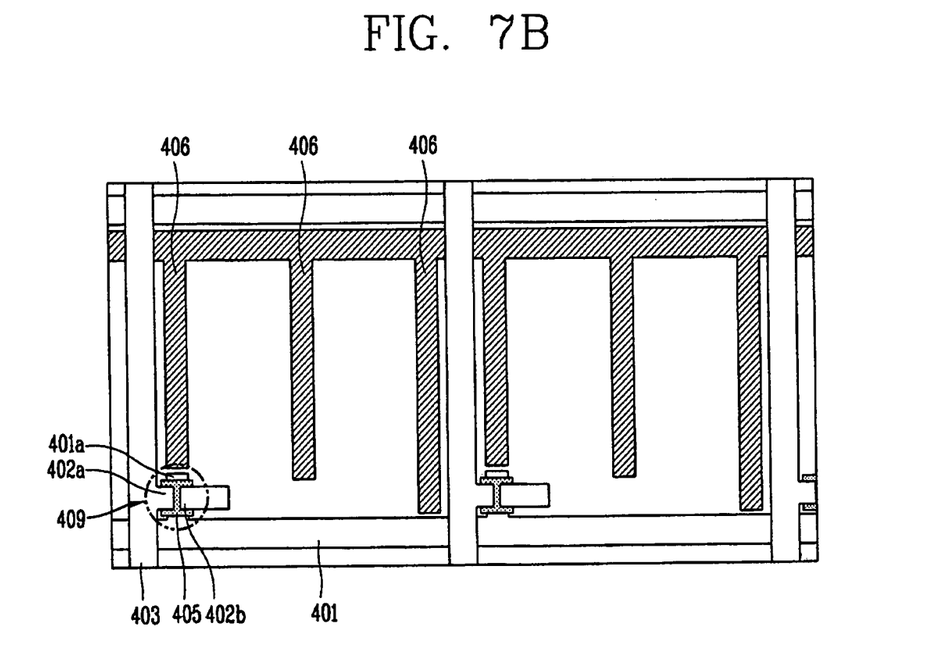
Figure 8B:
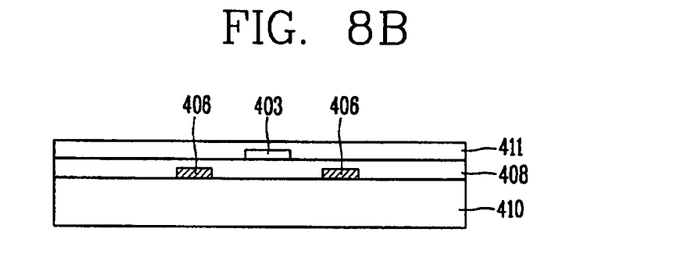

As shown in FIGS. 7B and 8B, amorphous silicon and n+ amorphous silicon are stacked on the gate insulation layer 408. Then, a second metal material such as Cu, Mo, Ta, Al, Cr, Ti, and Al alloy is deposited thereon. Thereafter, the amorphous silicon and n+ amorphous silicon and the second metal material are patterned to form a semiconductor layer 405 on the gate electrode 401a, a data line 403 arranged perpendicular to the gate line 401 and defining pixel region together with the gate line 401, and source and drain electrodes 402a and 402b separated at a predetermined interval on the semiconductor layer 405.

Thereafter, an inorganic material such as SiNx or SiOx or an organic material such as benzocyclobutene or acryl is applied on the substrate on which a thin film transistor 409 is formed, thereby forming a passivation layer 411.

Figure 7C:
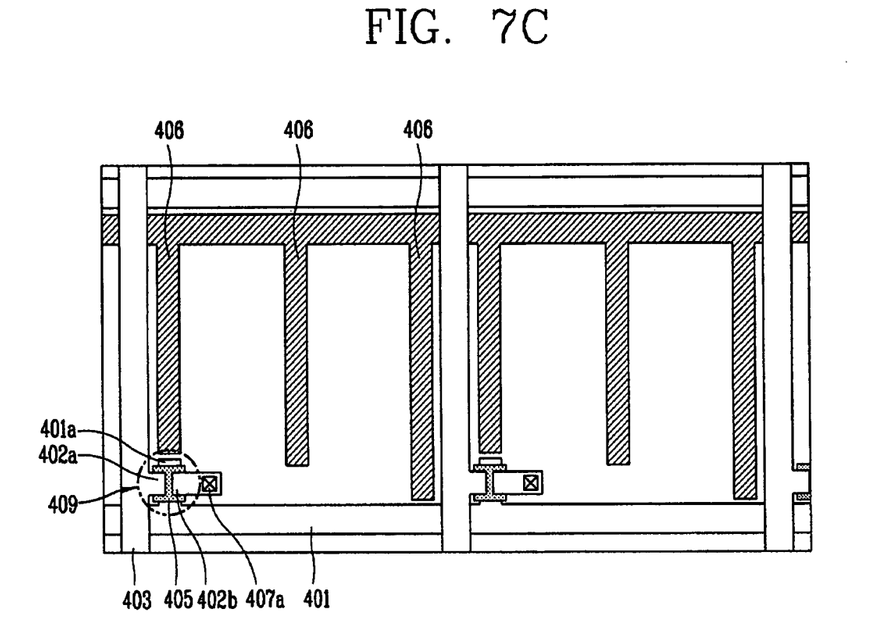

Subsequently, as shown in FIGS. 7C, a drain contact hole 407a which exposes part of the drain electrode 402b is formed.

Figure 7D:
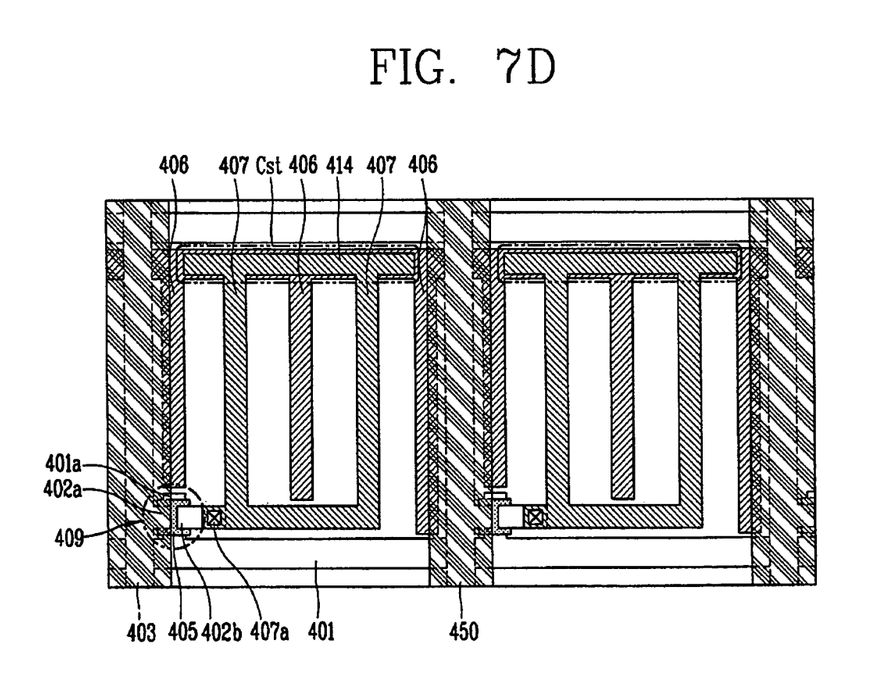
Figure 8C:
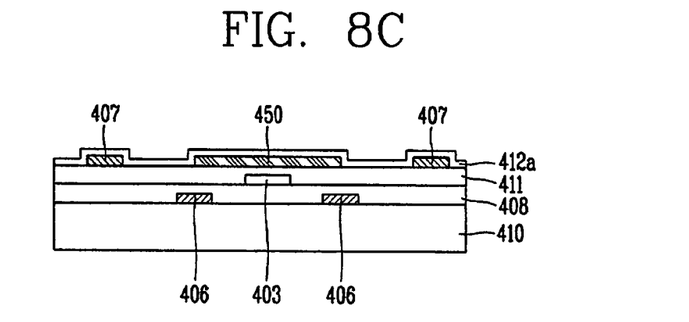

Then, as shown in FIGS. 7D and 8C, a transparent conductive material such as ITO (indium tin oxide) or IZO (indium zinc oxide) is deposited over the passivation layer 411 where the drain contact hole 407a is formed. Thereafter, the transparent conductive material is patterned to form a pixel electrode 407 arranged parallel to the common electrode 406 for generating an in-plane electric field in the pixel together with the common electrode 406, and to form a pixel electrode line 414 electrically connected to the pixel electrode 407. The pixel electrode line 414 forms a storage capacitor (Cst) by overlapping the common line 404. In addition, the light blocking line 450 for covering the gap between the data line 403 and the common electrode 406 adjacent to the data line 403 is formed on the passivation layer 411. Also, the light blocking line 450 may be formed as a single line.

Meanwhile, though not shown in the drawings, the light preventing line 450 may be formed as two lines in order to cover the gap between the data line 403 and the common electrode 406 only but not to cover the portion directly above the data line 403.

Figure 8D:
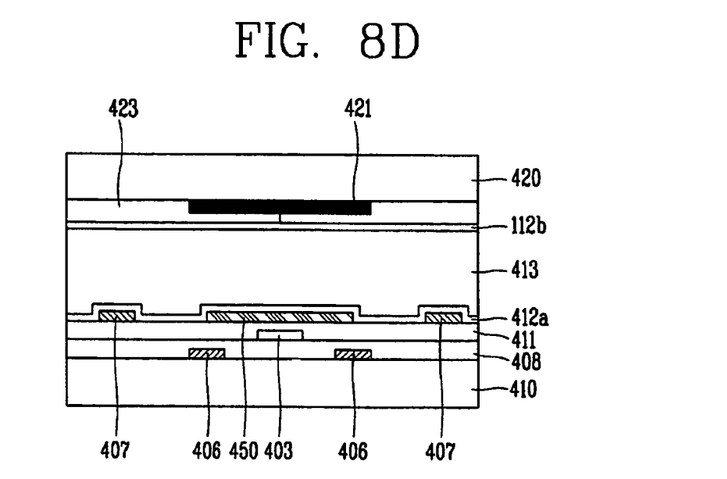

Subsequently, as shown in FIG. 8D, after a first alignment film 412a is applied, a second substrate 420 where a black matrix 421, a color filter 423, and a second alignment film 412b are formed is attached to the first substrate 410, so that an in-plane liquid crystal display device can be formed.

As described, the present invention provides a light blocking line capable of blocking light leakage through the gap between the data line and the common electrode adjacent to the data line. The present invention does not limit the structures of the pixel electrode and the common electrode, materials which they are formed of, or the like.

That is, the present invention is to provide a light blocking line capable of blocking light leakage through the gap between the data line and the common electrode. The light blocking line can be formed as a single line or plural lines. Accordingly, the present invention may apply to all in-plane switching mode liquid crystal display devices provided with the light blocking line between the data line and the common electrode adjacent to the data line.

As described so far, according to the present invention, in the in-plane switching mode liquid crystal display device, by providing the light blocking line between the data line and the common electrode adjacent to the data line, light leakage within a specific range of viewing angles can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A liquid crystal display device having a common electrode and a data line located on a first substrate in a vertical direction and a first gap between the common electrode and the data line in the vertical direction and a second gap between the common electrode and the data line in a horizontal direction, the liquid crystal device comprising:
    a gate line on the first substrate;
    a gate insulation layer over substantially an entire surface of the first substrate and above the gate line and the common electrode;
    the data line being above and contacting the gate insulation layer, the data line and the gate line crossing each other on the first substrate to define a pixel region, the data line and the gate line crossing each other at a crossing location;
    a passivation layer over substantially the entire surface of the first substrate and above the data line;
    a pixel electrode, the pixel electrode being above and contacting the passivation layer, the pixel electrode and the common electrode being parallel to each other at a distance to generate an in-plane electric field in the pixel region;
    a light blocking conductive line located on the first substrate and being vertically above and contacting the passivation layer, the light blocking conductive line being vertically above the common electrode covering the second gap between the data line and the common electrode adjacent to the data line;
    an alignment layer over the passivation layer, a part of the alignment layer being directly contacted with the upper surface of the light blocking conductive line;
    a liquid crystal layer formed between the first and second substrates; and
    a black matrix on the second substrate above the light blocking conductive line, the black matrix covering the data line, at least a part of common electrodes disposed at both sides of the data line, second gaps between the data line and the common electrodes at the both sides of the data line, and the light blocking conductive line,
    wherein a width of the black matrix is larger than that of the light blocking conductive line so that the light blocking conductive line is wholly covered with the black matrix, and
    wherein the light blocking conductive line further covers the crossing location of the data line and the gate line.

2. The device of claim 1, wherein the common electrode and the pixel electrode have a bent structure.

3. The device of claim 2, wherein the data line has a bent structure.

4. The device of claim 1, wherein the pixel electrode is formed of a transparent conductive material.

5. The device of claim 4, wherein the transparent conductive material is selected from one of ITO (indium tin oxide) and IZO (indium zinc oxide).

6. The device of claim 1, further comprising:
    a common line electrically connected to the common electrode;
    a pixel electrode line electrically connected to the pixel electrodes; and
    a storage capacitor, the common line and the pixel electrode being two electrodes of the storage capacitor.

7. The device of claim 1, wherein the light blocking conductive line and the pixel electrode are coplanar.

8. A liquid crystal display device having a common electrode and a data line located on a first substrate in vertical and horizontal directions and a first gap between the common electrode and the data line in the vertical direction and a second gap between the common electrode and the data line in the horizontal direction, and a second susbtrate, the liquid crystal device comprising:
    a gate line on the first substrate;
    a gate insulation layer over substantially an entire surface of the first substrate and above the gate line and common electrode;
    the data line being above and contacting the gate insulation layer, the data line and the gate line crossing each other on the first substrate to define a pixel region, the data line and the gate line crossing each other at a crossing location;
    a pixel electrode, the pixel electrode being above and contacting gate insulation layer, the pixel electrode and the common electrode being parallel to each other at a distance to generate an in plane electric field in the pixel region together with the common electrode;
    a passivation layer over substantially the entire surface of the first substrate and above the data line and the pixel electrode;
    a light blocking conductive line, the light blocking conductive line being above and contacting the passivation layer, the light blocking conductive line being vertically above the common electrode to cover the second gap between the data line and the common electrode adjacent to the data line;
    an alignment layer over the passivation layer, a part of the alignment layer being directly contacted with the upper surface of the light blocking conductive line;
    a black matrix on the second substrate above the light blocking conductive line, the black matrix covering the data line, at least a part of common electrodes disposed at both sides of data line, the second gaps between the data line and the common electrodes at the both sides of the data line, and the light blocking conductive line;
    the liquid crystal layer formed between the first and second substrates; and
    wherein a width of the black matrix is larger than that of the light blocking conductive line so that the light blocking conductive line is wholly covered with the black matrix, and
    wherein the light blocking conductive line further covers the crossing location of the data line and the gate line.

9. The device of claim 8, wherein the data line and the pixel electrode are coplanar.

10. A method for fabricating a liquid crystal display device, the method comprising:

provide a first substrate and a second substrate;

forming a gate line and a data line crossing each other on the first substrate to define a pixel region, the data line and the gate line crossing each other at a crossing location;

forming a common electrode on the first substrate;

forming a gate insulation layer above the common electrode;

forming a pixel electrode on the gate insulating layer, the pixel electrode and the common electrode being parallel to each other at a distance to generate an in plane electric field in the pixel region together with the common electrode;

forming a passivation layer over substantially an entire surface of the first substrate and above the data line and the pixel electrode;

forming a light blocking conductive line vertically below a black matrix, the light blocking conductive line being vertically above and contacting the passivation layer to cover a horizontal gap between the data line and the common electrode adjacent to the data line;

forming an alignment layer over the passivation layer, a part of the alignment layer being directly in contact with an upper surface of the light blocking conductive line;

forming a liquid crystal layer between the first and second substrates; and forming the black matrix on the second substrate above the light blocking conductive line, the black matrix covering the data line, at least a part of common electrodes disposed at both sides of the data line, the second gaps between the data line and the common electrodes at the both sides of the data line, and the light blocking conductive line, wherein a width of the black matrix is larger than that of the light blocking conductive line so that the light blocking conductive line is wholly covered with the black matrix, and wherein the light blocking conductive line further covers the crossing location of the data line and the gate line.

11. The method of claim 10, wherein the step of forming the pixel electrode includes forming the pixel electrode of a transparent conductive material.

12. The method of claim 10, wherein the step of forming the data line includes forming the data line above and in contact with the gate insulation layer to be coplanar with the pixel electrode.

* * * * *